(12) United States Patent
Oh et al.

(10) Patent No.: US 6,310,187 B1
(45) Date of Patent: Oct. 30, 2001

(54) REACTIVE RED DYES CONTAINING MONOCHLOROTRIAZINE AND ACETOXYETHYL SULFONE GROUPS

(75) Inventors: Sea Wha Oh; Myeong Nyeo Kang; Seung Rim Shin; Tae Kyung Kim; Mi Kyoung Song, all of Daejeon (KR)

(73) Assignee: Korea Research Institute of Chemical Technology (KR)

( * ) Notice: Subject to any disclaimer, the term of this patent is extended or adjusted under 35 U.S.C. 154(b) by 0 days.

(21) Appl. No.: 09/646,868

(22) PCT Filed: Mar. 26, 1999

(86) PCT No.: PCT/KR99/00145

§ 371 Date: Apr. 9, 2001

§ 102(e) Date: Apr. 9, 2001

(87) PCT Pub. No.: WO99/48983

PCT Pub. Date: Sep. 30, 1999

(30) Foreign Application Priority Data

Mar. 26, 1998 (KR) .................................. 98-10608

(51) Int. Cl.$^7$ .................................. C09B 62/51
(52) U.S. Cl. ............................. 534/638
(58) Field of Search ............................. 534/638

(56) References Cited

U.S. PATENT DOCUMENTS 4,341,699 * 7/1982 Tezuka et al. ........................ 534/638

FOREIGN PATENT DOCUMENTS

| 29 29 107 | 1/1980 | (DE) . |
| 064 711 A1 | 11/1982 | (EP) . |
| 1 351 491 | 5/1974 | (GB) . |
| 81 22354 | 5/1996 | (JP) . |

* cited by examiner

*Primary Examiner*—Fiona T. Powers
(74) *Attorney, Agent, or Firm*—Finnegan, Henderson, Farabow, Garrett & Dunner, LLP

(57) ABSTRACT

The present invention relates to a bifunctional red reactive dye and more particularly, to the bifunctional red reactive dye with monochlorotriazine and acetoxyethylsulfone as reactive groups expressed by formula (I), wherein, M is alkaline metal atom, which provides excellent combination of properties in that 1) the introduction of aminophenyl-β-acetoxyethylsulfone group to the dye may minimize the loss of dye, since its low solubility to water lessens the amount of the remaining solution during filtration, 2) an easier salting-out process requires a smaller amount of salt during the process so that the costs for the treatment of waste water may be significantly reduced, and 3) a better dyeing yield with enhanced substantivity and better brightness in color

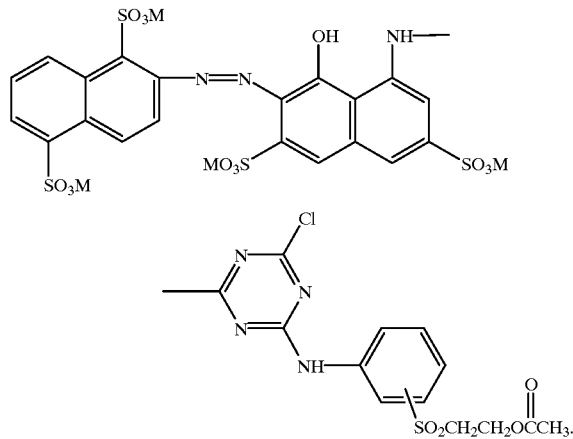

2 Claims, No Drawings

REACTIVE RED DYES CONTAINING MONOCHLOROTRIAZINE AND ACETOXYETHYL SULFONE GROUPS

BACKGROUND OF THE INVENTION

1. Field of the Invention

The present invention relates to a bifunctional red reactive dye and more particularly, to the bifunctional red reactive dye with monochlorotriazine and acetoxyethylsulfone as reactive groups expressed by the following formula 1, which provides excellent combination of properties in that 1) the introduction of aminophenyl-β-acetoxyethylsulfone group to the dye may minimize the loss of dye, since its low solubility to water lessens the amount of the remaining solution during filtration, 2) an easier salting-out process requires a smaller amount of salt during the process so that the costs for the treatment of waste water may be significantly reduced, and 3) a better dyeing yield with enhanced substantiality and better brightness in color.

FORMULA 1

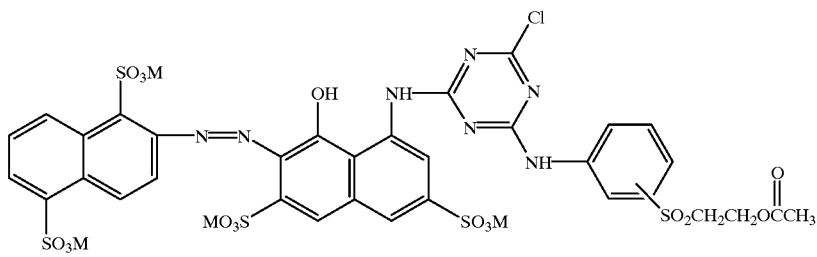

wherein, M is alkaline metal atom.

2. Description of the Related Art

The salting-out process is being currently performed as a method of isolating a dye from the reaction mixture after a reactive dye is synthesized. However, in the case of synthesizing a dye in the presence of an aminophenyl-β-sulfatoethylsulfone compound as an intermediate for the manufacture of a vinylsulfone reactive dye, a method of isolating a dye from the reaction mixture is carried out based on a spray drying or in the presence of a large amount of salts owing to the fact that a higher solubility of the dye to water makes it difficult to perform the salting-out process. These methods have brought about the environmental pollution, and the cost for the treatment of waste water containing a very high concentration of residual dye becomes enormous.

In particular, a red reactive dye containing an aminophenyl-β-sulfatoethylsulfone compound has a poor substantivity due to its high solubility to water.

Under the current situation where the developed countries such as Europe and U.S.A. has strictly regulated the amount of salt in waste water containing a dye, intensive researches have focused on the manufacture of a low-salt dye and thus, these dyes have been commercialized in a continual manner. There is an increasing trend in favor of the use of a liquid dye in an effort to protect an operator's health and to meet an accurate content of dye in keeping pace with the automatic dyeing process. Thus, the use of a high-concentration dye without any salt should be essential for the manufacture of a stable liquid dye.

Since the solubility of an aminophenyl-β-acetoxyethylsulfone compound, expressed by the following formula 2, is a relatively lower than that of an aminophenyl-β-sulfatoethylsulfone, the synthesis of a red reactive dye using the former as a reacting group has an advantage in that the salting-out process may be easily available in most cases, except for special occasions.

FORMULA 2

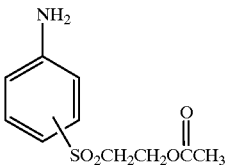

The process of synthesizing a dye in the presence of an aminophenyl-β-acetoxyethylsulfone compound, expressed by the following formula 2, requires less amount of salt than the conventional dye during the salting-out process which may contribute to reduced salt concentration of waste water. The introduction of aminophenyl-β-acetoxyethylsulfone group to the dye may minimize the loss of dye, since its low solubility in water lessens the amount of the remaining solution during filtration, thus contributing to further reduction of treatment cost on waste water. Further, a dye, so obtained, has a very high purity and low concentration of salt so that the concentration of salt in waste water may be reduced and the desalting process for manufacturing a liquid dye is quite easy.

The well-known compound expressed by the formula 2 have been disclosed in several literatures. Among related compounds, an manufacturing example for 4-aminophenyl-β-acetoxyethylsulfone (Japanese Unexamined Publication No. 81-22354, German Patent No. 2,929,107) is shown in the following scheme 1:

Scheme 1

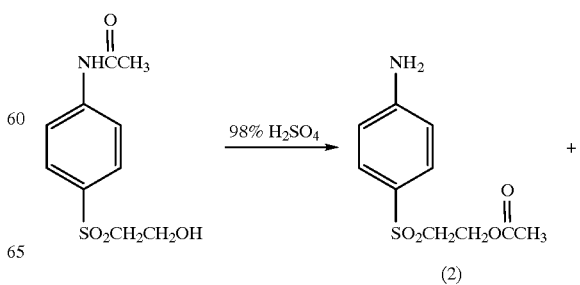

(2)

-continued

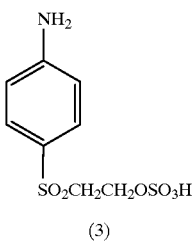

(3)

Treatment of 98% sulfuric acid to 4-acetaminophenyl-β-hydroxyethylsulfone gives a compound where two compounds expressed by the formulae (2) and (3) are mixed in the ratio of 70:30. The dye containing the mixture, so synthesized, has been reported to show excellent properties of dye. However, if a dye is synthesized using a mixture obtained from the scheme 1, the presence of 4-aminophenyl-β-sulfatoethylsulfone is responsible for reduction of substantivity due to its a very high solubility to water.

Nonetheless, any efforts to synthesize a red reactive dye expressed by the formula 1 has not been made using aminophenyl-β-acetoxyethylsulfone expressed by the formula 2.

SUMMARY OF THE INVENTION

The inventors have made intensive studies to generate a red reactive dye with high yield and purity and as a result of this, have succeeded in synthesizing a red reactive dye using aminophenyl-β-acetoxyethylsulfone and monochlorotriazine as reactive groups. Thus, this invention has been completed.

Therefore, an object of this invention is to provide a bifunctional red reactive dye which has an excellent combination of properties such as reduced environmental pollution during the manufacture of a dye, more brightness in color, lower solubility to water, and higher dyeing yield.

DETAILED DESCRIPTION OF THE INVENTION

This invention relates to a bifunctional red reactive dye expressed by the following formula 1:

wherein, M is alkaline metal atom

This invention is also characterized by a process for preparing a bifunctional red reactive dye expressed in the formula 1, which comprises the steps of:

(a) condensing both 1-naphthol-8-amino-3,6-disulfonic acid and cyanuric chloride;

(b) diazotizing 2-naphthylamine-1,5-disulfonic acid and then coupling with the condensation reaction mixture of step (a); and (c) condensing both aminophenyl-β-acetoxyethylsulfone, expressed by the following formula 2 and the reaction mixture of step (b).

FORMULA 2

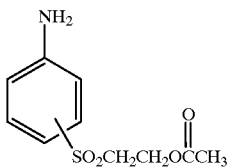

FORMULA 1

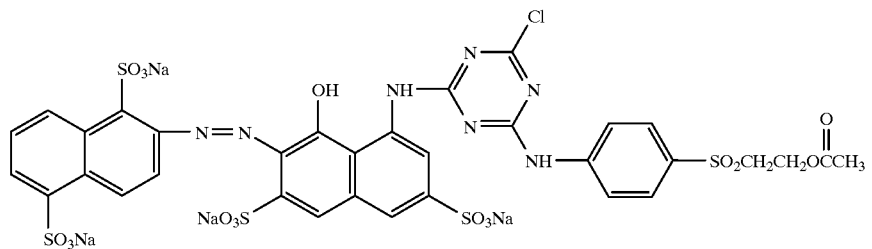

FORMULA 1

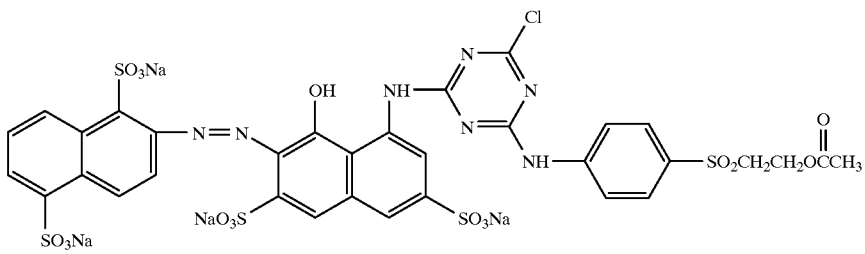

wherein, M is alkaline metal atom.

The process for manufacturing a bifunctional red reactive dye expressed by the formula 1 is explained in more detail as set forth hereunder.

The first step is to condense both 1-naphthol-8-amino-3,6-disulfonic acid and cyanuric chloride. The condensation is performed in the range of pH 1.0–3.0, preferably in the range of pH 1.5–2.5 at 0–5° C. If the reaction solution has less than pH 1, the reaction rate is extremely slow so that cyanuric chloride becomes hydrolyzed and in case of exceeding pH 3, cyanuric chloride becomes readily decomposed. Further, if the temperature is lower than 0° C., no reaction occurs and in case of exceeding 5° C., the yield of the reaction will be lowered due to generation of by-products.

The second step is to diazonate 2-naphthylamine-1,5-disulfonic acid, followed by its coupling with the first reaction mixture, so condensed. Hence, the diazotization is a commonly available method; for example 2-naphthylamine-1,5disulfonic acid is dissolved in water at 0–5° C. and with the addition of concentrated hydrochloric acid and NaNO$_2$, the diazotization is carried out. Then the compound, so diazotized, as added to the condensed solution (1) at less than pH 7 and at 0–5° C. so as to avoid the generation of by-products.

The third step is to condense the aminophenyl-β-acetoxyethylsulfone compound expressed by the formula 2 and the coupling solution (2) at 35–40° C. to produce a bifunctional red reactive dye, expressed by the formula 1, having two groups of monochlorotriazine and acetoxyethylsulfone as a desired compound of this invention. Hence, the condensation is performed at 35–40° C. and when the condensation is completed, a final product is obtained by the salting-out process.

According to this inventions the aminophenyl-β-acetoxyethylsulfone compound as a raw material, expressed by the formula 2, is prepared by a simple reaction between acetaminophenyl-β-hydroxyethylsulfone with a mixture of hydrogen chloride and acetic acid.

As described above, the third-step condensation using the conventional aminophenyl-β-sulfatoethylsulfone requires 2.5–3 hours, while the use of aminophenyl-β-acetoxyethylsulfone expressed by the formula 2 completes the reaction within about 1 hour. In this respect, a shortened reaction time contributes to further reduction in manufacturing cost. In addition, less by-products are generated in a method of synthesizing a red reactive dye in the presence of aminophenyl-β-acetoxyethylsulfone expressed by the formula 2 than the convention method using aminophenyl-β-sulfatoethylsulfone. When the red reactive dye is sprayed by drying, more bright color can be expressed. However, to obtain more bright-color dye, a salting-out process should be performed. Unlike the conventional dye yielding a solid dye of 65–70% due to its high solubility to water, a dye according to this invention has a very high yield of 84–88% due to its low solubility to water.

Since the bifunctional red reactive dye expressed by the formula 1 of this invention is obtained with less salts and little by-products via simple procedure such as salting-out due to its low solubility to water, the removal of salts from the dye is easily made available. This invention is also advantageous in manufacturing a liquid dye in an effort to protect an operator's health and to meet an accurate content of dye in keeping pace with the automatic dyeing process. The remaining solution containing relatively less amounts of dye and salt has proven to be more economical in the treatment of waste water. Since the aminophenyl-β-acetoxyethylsulfone compound expressed by the formula 2 had no a sulfuric acid group which is present in the aminophenyl-β-sulfatoethylsulfone compound, the amount of alkali for neutralization may be reduced during the coupling reaction.

When a cotton is dyed using the bifunctional red reactive dye to cotton, it provides excellent combination of properties in terms of brightness, yield and fastness, compared with the use of the conventional red reactive dye.

The following specific examples are intended to be illustrative of the invention and should not be construed as limiting the scope of the invention as defined by appended claims.

Manufacturing Example

Preparation of 4-aminophenyl-β-acetoxysulfone

A mixture of 60 g (1 mol) of acetic acid and 1.8 g (0.1 mol) of water was added to a 100 ml flask equipped with a condenser with a balloon and then 5.5 g (0.15 mol) of hydrogen chloride gas was slowly injected to a reaction solution for 1.5–2 hours, while maintaining the temperature at 15° C. 24.3 g (0.1 mol) of 4-acetaminophenyl-β-hydroxyethylsulfone was added to the mixture, heated slowly to 70–75° C. for 1 hour and stirred for 9 hours.

The reaction mixture was cooled down to room temperature, filtered, and washed with 5 ml of acetic acid two times. The solid, so filtered, was dried under the vacuum at 60° C., dissolved in a mixture of ice (10 g) and water (25 ml) and neutralized with 15% sodium carbonate in aqueous solution for filtration of crystals. The filtrate was washed with water (5 ml) three times and dried to give a pure form of 4-aminophenyl-β-acetoxyethylsulfone as a white solid (84.8%, purity 97.5%).

m.p.: 92–93° C.

Example 1

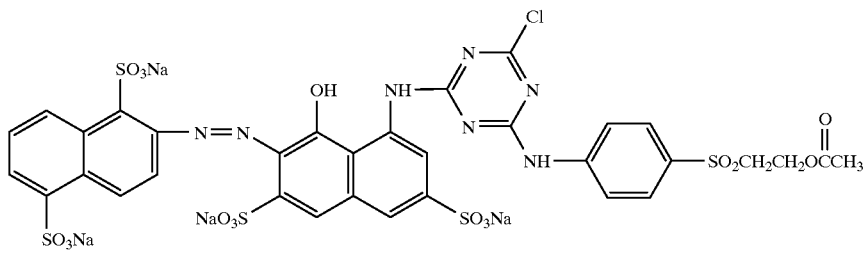

Step (a): 1-naphthol-8-amino-3,6-disulfonic acid (17.56 g, 0.055 mol) was dissolved in water (85 ml) and neutralized with 4N NaOH in aqueous solution. Then, a solution of cyanuric chloride (10.88 g, 0.06 mol) in water (85 ml) was maintained at the temperature of 0–5° C. and with the addition of ice (10 g), 1-naphthol-8-amino-3,6-disulfonic acid in aqueous solution, so formed, was slowly added to the solution of cyanuric chloride. When all amounts of 1-naphthol-8-amino-3,6-disulfonic acid in aqueous solution were added, the reaction mixture was adjusted at pH 1.5–2.5 and further stirred for 1.5 hours to complete the condensation. Excess of cyanuric chloride was filtered and evaporated by filtration.

Step (b): 35% HCl (10.86 ml, 0.125 mol) was added to 2-naphthylamino-1,5-disulfonic acid (15.17 g, 0.05 mol) dissolved in water (230 ml) at a separate reactor. The reaction mixture was maintained at 0–5° C. and with the addition of ice (10 g), $NaNO_2$ (16.7 ml, 3N, 0.05 mol) was further added to the mixture and stirred for 1 hour to complete the diazotization. Sulfamic acid was added to the mixture for removal of excess of $HNO_2$.

While maintaining the temperature at 0–5° C., the diazotized solution, so formed, was simultaneously added to the solution, so condensed from the (a) step and dissolved in ice (10 g). The mixture was stirred for 10 minutes and then 15% sodium carbonate solution (75 ml) was slowly dropped to the mixture for more than 30 minutes through a funnel, while maintaining the pH lower than 7. The reaction mixture was stirred for additional 1.5 hours.

Step (c): 4-aminophenyl-β-acetoxyethylsulfone (12.17 g, 0.05 mol) was added to the monoazotized solution, so prepared from the b) step, for 1 hour and then the temperature was increased up to 35–40° C. While maintaining the pH at 6.0–6.5, the reaction mixture was further stirred for 1 hour. After the reaction was completed, the pH was adjusted at 7.5 and with the addition of $KH_2PO_4$, the pH was readjusted at pH 6.0–6.5. The reaction mixture was salted-out, filtered and dried to give a red reactive dye.

$^1$H-NMR (300 MHZ, DMSO-$d_6$): d 1.80 (3H, s), 3.78 (2H, t), 7.43 (1H, d), 7.46 (1H, s), 7.57 (1H, s), 7.89 (1H, d), 7.99–8.15 (4H,m), 8.74(1H, d), 8.93 (2H, d), 0.11 (1H, d), 10.95(1H, br s), 13.21 (1H, br s), 16.46 (1H, br s)

Example 2

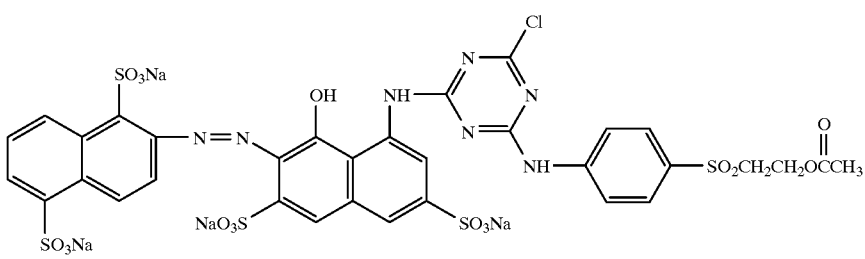

Step (a): 1-naphthol-8-amino-3,6-disulfuric acid (10.54 g, 0.033 mol) was dissolved in water (50 ml) and neutralized with 4N NaOH in aqueous solution. Then, a solution of cyanuric chloride (6.53 g, 0.036 mol) in water (50 ml) was maintained at the temperature of 0–5° C. and with the addition of ice (10 g), 1-naphthol-8-amino-3,6-disulfonic acid in aqueous solution, so formed, was slowly added to the solution of cyanuric chloride. When all amounts of 1-naphthol-8-amino-3,6-disulfonic acid in aqueous solution were added, the reaction mixture was adjusted at pH 1.5~2.5 and further stirred for 1.5 hours to complete the condensation. Excess of cyanuric chloride was filtered out.

Step (b): 35% HCl (6.5 ml, 0.075 mol) was added to 2-naphthylamino-1,5-disulfonic acid (9.10 g, 0.03 mol) dissolved in water (140 ml) at a separate reactor. The reaction mixture was maintained at 0–5° C. and with the addition of ice (10 g), $NaNO_2$ (10 ml, 3N, 0.03 mol) was further added to the mixture and stirred for 1 hour to complete the diazotization. Sulfamic acid was added to the mixture for removal of excess of $HNO_2$.

While maintaining the temperature at 0–5° C., the diazotized solution, so formed, was simultaneously added to the solution, so condensed from the (a) step and dissolved in ice (10 g). The mixture was stirred for 10 minutes and then 15% sodium carbonate solution (45 ml) was slowly dropped to the mixture for more than 30 minutes through a funnel, while maintaining the pH lower than 7. The reaction mixture was stirred for additional 1.5 hours.

Step (c): 4-aminophenyl-β-acetoxyethylsulfone (10.05 g, 0.036 mol) was added to the monoazotized solution, so prepared from the b) step, for 1 hour and then the temperature was increased up to 35–40° C. While maintaining the pH at 6.0–6.5, the reaction mixture was further stirred for 1 hour. After the reaction was completed, the pH was adjusted at 7.5 and with the addition of $KH_2PO_4$, the pH was readjusted at pH 6.0–6.5. The reaction mixture was salted-out, filtered and dried to give a red reactive dye.

$^1$H-NMR (300 MHz, DMSO-$d_6$): d 1.76 (3H, s), 3.72 (2H, t), 4.28 (2H, t), 7.45(1H, t), 7.48 (1H, s), 7.58 (1H, s), 7.60 (1H, d), 7.80 (1H, s), 7.90 (1H, d), 8.28–8.33 (2H, m), 8.74 (1H, d), 8.94 (2H, d), 9.12 (1H, d), 10.83(1H, s), 13.01 (1H, s), 16.55 (1H, s)

Comparative Example

A red reactive dye was prepared in the same manner as Example 1, except that 4-aminophenyl-β-sulfatoethylsulfone was used instead of 4-aminophenyl-β-acetoxyethylsulfone.

Experimental Example

After the red reactive dye synthesized in example 1 and 2 was dyed to cotton, the dyeing yield and fastness were measured. The percentages on dyeing exhaustion were measured by equation 1.

$$[(1-(A/A_0)] \times 100 \qquad \text{Equation 1}$$

wherein, $A_0$ is an absorbance of dye bath before dyeing;
A is the sum of absorbance after dyeing and washing.

TABLE 1

| Category | | Example 1 | Example 2 | Comparison example |
|---|---|---|---|---|
| Dyeing Yield (%) | 1% o.w.f. | 91.5 | 92.0 | 87.5 |
| | 2% o.w.f. | 90.2 | 89.8 | 86.8 |
| | 3% o.w.f. | 88.2 | 87.0 | 84.8 |
| Light fastness* (%) | 1% o.w.f. | 4 | 4 | 4 |
| | 3% o.w.f. | 4–5 | 4–5 | 4–5 |

*measured in accordance with KS K 0218 direct radiation method

From the table 1, it was noted that a dyeing material, which was prepared from the red reactive dye of this invention (example 1 and 2), showed a very high dyeing, yield, compared with that of the conventional red reactive dye (comparative example) due to the different functional groups in spite of the same structure. The sunlight fastness was same in grade but less discoloration was observed from the red reactive dye of this invention. Also, the red reactive dye of this invention was excellent in terms of a washing fastness (KS K 030 A-4), perspiration(acidity, alkalineness) fastness (AATCC Method 14) and chloride fastness (JIS-0884-1983) which were in all 5th grade. The levelness of dyeing and reproductivity was excellent.

As described above, it is noted that the red reactive dye with bifunctional groups such as monochlorotriazine and acetoxyethylsulfone has an excellent combination of properties such as reduced environmental pollution during the manufacture of a dye, more brightness in color, lower solubility to water, and higher dyeing yield.

What is claimed is:
1. A bifunctional red reactive dye expressed by the following formula 1:

FORMULA I

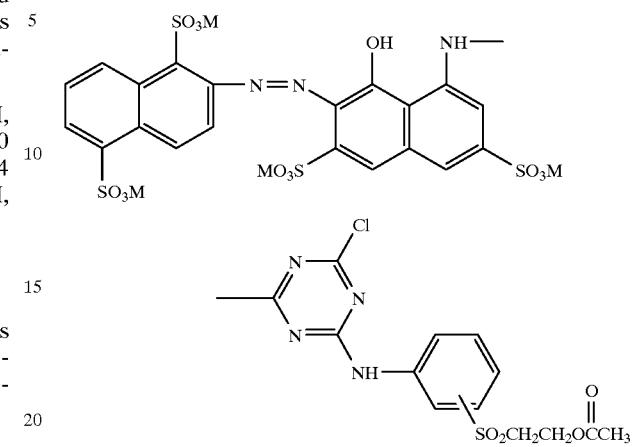

wherein, M is alkaline metal atom.

2. A process for preparing a bifunctional red reactive dye expressed in the formula 1, which comprises the steps of:
(a) condensing both 1-naphthol-8-amino-3,6-disulfonic acid and cyanuric chloride;
(b) diazotizing 2-naphthylamine-1,5-disulfonic acid and then coupling with the condensation reaction mixture of step (a); and
(c) condensing both aminophenyl-β-acetoxyethylsulfone, expressed by the following formula 2and the reaction mixture of step (b)

FORMULA 2

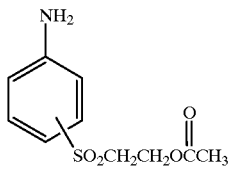

FORMULA I

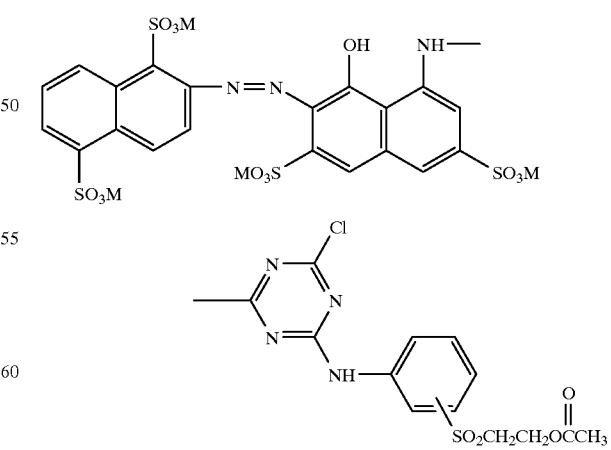

wherein, M is alkaline metal atom.

* * * * *

UNITED STATES PATENT AND TRADEMARK OFFICE
CERTIFICATE OF CORRECTION

PATENT NO.  : 6,310,187 B1
DATED       : October 30, 2001
INVENTOR(S) : Sae Wha Oh et al.

It is certified that error appears in the above-identified patent and that said Letters Patent is hereby corrected as shown below:

<u>Column 10, claim 2,</u>
Line 32, change "2and" to -- 2 and --.

Signed and Sealed this

Ninth Day of April, 2002

Attest:

*Attesting Officer*

JAMES E. ROGAN
*Director of the United States Patent and Trademark Office*